United States Patent [19]

Warburton

[11] Patent Number: 5,019,313
[45] Date of Patent: May 28, 1991

[54] METHOD FOR MOLDING CONTAINERS AND FORMING HOLE THEREIN

[75] Inventor: Richard T. Warburton, Canandaigua, N.Y.

[73] Assignee: Mobil Oil Corporation, Fairfax, Va.

[21] Appl. No.: 466,797

[22] Filed: Jan. 18, 1990

Related U.S. Application Data

[62] Division of Ser. No. 311,809, Feb. 16, 1989, Pat. No. 4,909,721.

[51] Int. Cl.$^5$ ............................................. B29C 51/32
[52] U.S. Cl. ................................. 264/154; 264/156; 264/163; 425/290
[58] Field of Search ....................... 264/154, 156, 163; 425/289, 292, 306, 290; 83/690, 694, 695, 700, 21, 914

[56] References Cited

U.S. PATENT DOCUMENTS

| | | | |
|---|---|---|---|
| 3,279,293 | 10/1966 | Giordano | 83/694 |
| 3,742,801 | 7/1973 | Cailloux | 83/700 |
| 3,845,187 | 10/1974 | Dahlberg | 264/154 |
| 3,862,817 | 1/1975 | Dahlberg | 425/292 |
| 4,108,941 | 8/1978 | Kermoian | 264/163 |
| 4,446,088 | 5/1984 | Daines | 264/156 |
| 4,612,153 | 9/1986 | Mangla | 425/292 |

FOREIGN PATENT DOCUMENTS 63-196311  8/1988  Japan ........................ 83/694

Primary Examiner—Jeffery Thurlow
Assistant Examiner—Mathieu Vargot
Attorney, Agent, or Firm—A. J. McKillop; C. J. Speciale; J. P. O'Sullivan, Sr.

[57] ABSTRACT

A male and female mold parts combination for forming a latch opening in a container molded from a softened sheet of plastic having a female mold key member arranged on the female mold part; a male mold key member arranged on the male mold part; a cutting edge adjacent to a planar face of one key and a vertical surface having a bevelled edge surface on the other key. The keys being normally registered so that on closure of the mold parts, initial contact will involve the cutting edge, the bevelled edge surface and the plastic therebetween. One of the keys is fixed in one of the mold parts and the other of the keys being located in the other of the mold parts and free to move independently of its mold part so that on closure of the mold parts the cutting edge will ride off the bevelled edge surface and slide across the vertical surface piercing and enlarging a latch opening in the plastic. The free to move key is carried so that on separation of the mold parts it is returnable to its original position and attitude occupied just prior to said initial contact.

5 Claims, 4 Drawing Sheets

METHOD FOR MOLDING CONTAINERS AND FORMING HOLE THEREIN

This is a division of copending application Ser. No. 311,809, filed on Feb. 16, 1989, now U.S. Pat. No. 4,909,721.

The present invention relates to a method for forming an orifice in a plastic part during the shape molding thereof and an apparatus for accomplishing the same.

Beginning in the 1960's, thermoplastic containers began to compete with containers traditionally made of paper pulp or comparatively dense organic plastic materials. U.S. Pat. Nos. 3,845,187 and 3,862,817 (the disclosures of which are incorporated in their entirety herein) are concerned with the thermoplastic molding of containers such as egg cartons and the like. These patents teach that latch hole openings can be formed in the top front cover of egg cartons during the process of molding the container. The patents teach that moldable plastic is shape-molded by forming and compression between a pair of cooperating mold members; and, during this molding, key members cooperate with a combination of a bevel and oblique surfaces to first pierce said plastic, and, second, continuation of relative motion between the key members, enlarges the regions pierced to create the needed orifices by scraping and tearing the side edges. These orifices then serve as latch hole openings. They cooperate with a lower flap member and together form a secure latching arrangement which can keep the container structure closed.

Automatic thermoformation equipment designed to form a plurality of structures simultaneously are normally massive pieces of equipment which are expected to continuously operate up to 3 work shifts per day, seven days a week. This equipment utilizes male and female mold members which define the thermoformed structures. Each half of the mold is a dense machined tool member which must stand up to repetitive thermoformation operations which not only involve physical force but rapid wide changes in temperature. Failure of even the smallest component of the mold structures will cause a shutdown of the thermoformation apparatus. If, for example, a thermoformation apparatus includes 8 egg carton molds, i.e., 16 half molds, a failure in any component part of any of the 16 half molds will cause a shutdown of the system until the cause is corrected.

A common cause of shutdown in the system involves the key members utilized in the half molds for forming the orifices in the containers. In order to extend the life of the key members, at least one of them may be made to yield in a direction transverse to the closure of the molds in order to avoid destruction or early wear failure. These key members are usually spring biased so that this transverse motion can be permitted with return of the key member to its proper location after the transverse motion is completed. It has been suggested to either place a resilient member or a spring member behind one or the other of the key members so that during mold closures any misalignment of the key member will not lead to early self-destruction. These spring or elastic means have not always served the purpose for a reasonable period of time. Failure of the resilient or spring member leads to failure of the key members soon thereafter, or inadequate formation of latch holes.

It is an object of the present invention to improve the reliability of the members employed to form the desired orifices in plastic parts.

SUMMARY OF THE INVENTION

The present invention is concerned with male and female mold parts combination for forming a latch opening in a container molded from a softened sheet of plastic. The combination includes:

(a) a female mold key member arranged on said female mold part;

(b) a male mold key member arranged on said male mold part;

(c) a cutting edge on one key adjacent to a planar surface thereof and, a vertical surface having a bevelled edge surface on the other key, said keys being normally registered so that on closure of said mold parts, initial contact will involve said cutting edge, said bevelled edge surface and said plastic therebetween;

(d) one of said keys being fixed in one of said mold parts and the other of said keys being located in the other of said mold parts and free to move independently of its mold part so that on closure of said mold parts said cutting edge will ride off said bevelled edge surface, said planar and vertical surfaces will assume a contacting parallel relationship and slide across one another, this action resulting in piercing and enlarging a latch opening in said plastic; and (e) said free to move key being carried so that, on separation of said mold parts, it is returnable by force of gravity to its original position occupied just prior to said initial contact.

The present invention is also concerned with a process of creating an orifice in a plastic part during the shape molding thereof. In a prior art technique, moldable plastic is placed between a pair of conformable mold members and compression is applied thereto and, during said molding, opposed key members in each mold member pierce and form an orifice in the plastic. The process of the present invention utilizes an improvement in this process comprising: providing a cutting edge on one key member adjacent to a planar surface thereof and a vertical surface having a bevelled edge on the other key member, one of said keys being fixed in its mold part and the other key being located in its mold part and supported so as to be free to move independently thereof; registering said keys and closing said mold parts so that initial contact will involve said cutting edge, said bevelled edge and said plastic therebetween, on further closure riding said cutting edge off said bevelled edge surface, causing said planar and vertical surfaces to assume a contacting parallel relationship and to slide across one another thereby piercing and enlarging a latch opening in said plastic; and separating said mold parts, removing the shaped plastic and positioning the mold member carrying said free to move key so that it will return by force of gravity to its original position occupied just prior to said initial contact.

It is important that the key that is free to move in relation to the mold half in which it is mounted, be returnable to its original position occupied just prior to said initial contact so that it will always be properly positioned and ready to form the next orifice during the next molding cycle. As alternatives to it being returnable by force of gravity, there are several other techniques which can be employed to return this key to its appropriate position. One alternative technique involves the use of magnetic forces in order to draw the movable key back to its original position. Further details of this technique will be discussed below. Yet another alternative technique for returning this key to its original position is to employ hydraulically transmitted forces which act on the movable key to return it to its original position. Yet another technique is to return the key in response to the force of propelled gas, e.g., a short blast of air. This technique is particularly attractive because it can be employed in combination with the force of gravity and at the same time act as a cleaning means to expel any debris from the key area. Therefore, it is to be understood that the above-described mold combination and method of molding and hole formation can be appropriately modified to employ these other techniques alone or in combination to return the movable key to its appropriate position.

DETAILED DESCRIPTION OF THE INVENTION

Figure 1:
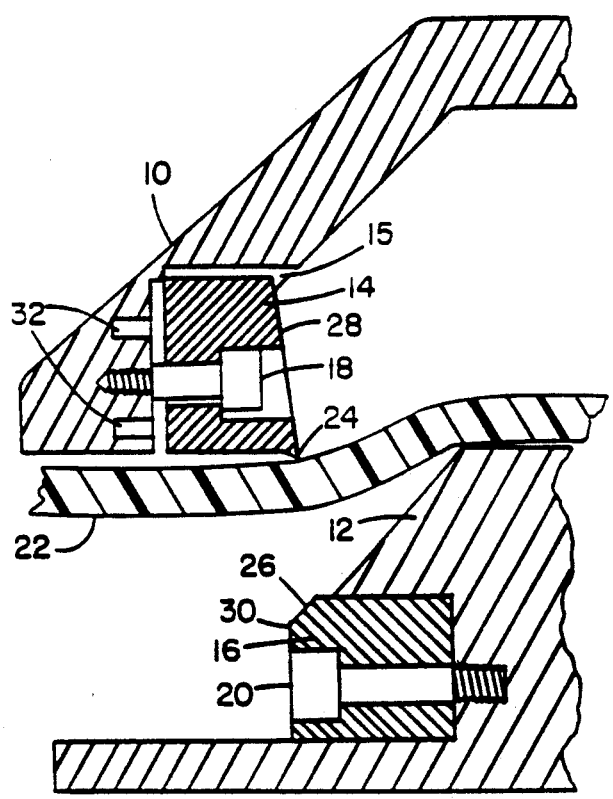
FIG. 1 is a side elevational view in cross section of a fragment of a male and female mold arrangement positioned at the beginning of a molding sequence.

Referring to FIG. 1, there is seen in an enlarged fragmentary side elevational cross section, a portion of two mold halves of the type which would form, for example, a 12-cell egg carton as illustrated in above-referenced U.S. Pat. Nos. 3,845,187 and 3,862,817. FIG. 1 illustrates the component parts of the mold half combinations which, during molding of a heat softened plastic sheet, would simultaneously, with shape molding the plastic, form latch hole or latch holes therein. While reference will be given to top and bottom herein in relation to the mold halves, it is to be understood that the bottom and the top can be reversed and therefore it is only relative position which is important. Moreover, the location of the specific keys of the drawings as being in the male and female mold half is for illustration only. They can be reversed and function essentially in the same fashion.

FIG. 1 shows the front part of top female mold 10 normally spaced from part of the front of bottom male mold 12. These members are shown in their normally spaced apart relationship, early in a molding operation where a heat softened sheet of thermoplastic material 22 is beginning to be shape formed. Carried by top female mold 10 is a female key 14 and carried by bottom male mold 12 is a male key 16. Female key 14 is held in position in a chamber 15 machined out of top mold 10. It is held in position, for example, by means of a shoulder bolt 18. The female key 14 is held so as to be freely moveable within a particular range to be described hereinafter. Male key member 16 is fixed in position in bottom male mold 12 by means of, for example, shoulder bolt 20. Female key 14 has a cutting edge 24 located thereon. This cutting edge is shown as having an acute angle in cross section, but it is to be understood that the cutting edge can range from a 90 degree corner edge to any angle less than this consistent with durability and long term use. The length of the cutting edge, of course, will be consistent with the size of the orifice desired. Female key 14 has a planar face 28 in association with cutting edge 24. Male key 16 has a bevelled or chamfered edge 26 located in association with a vertical face 30.

Figure 2:
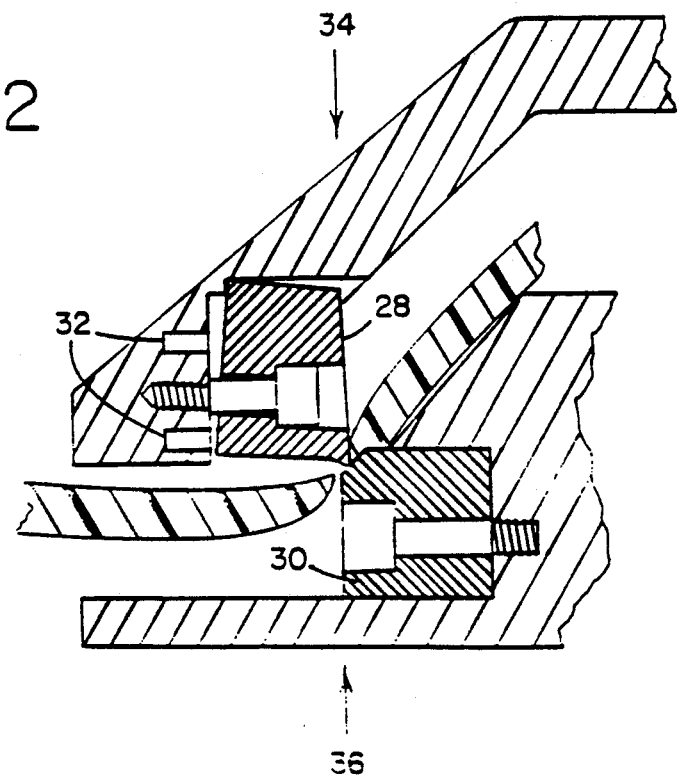
FIG. 2 shows the mold arrangement of FIG. 1 advancing to an early phase of the molding process.
Figure 3:
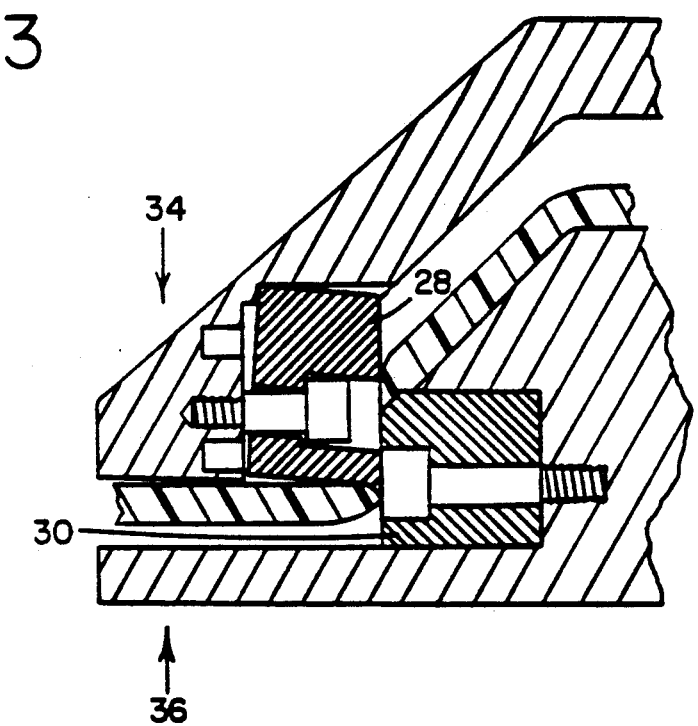
FIG. 3 shows the mold arrangement of FIG. 2 further advanced in the molding sequence.
Figure 4:
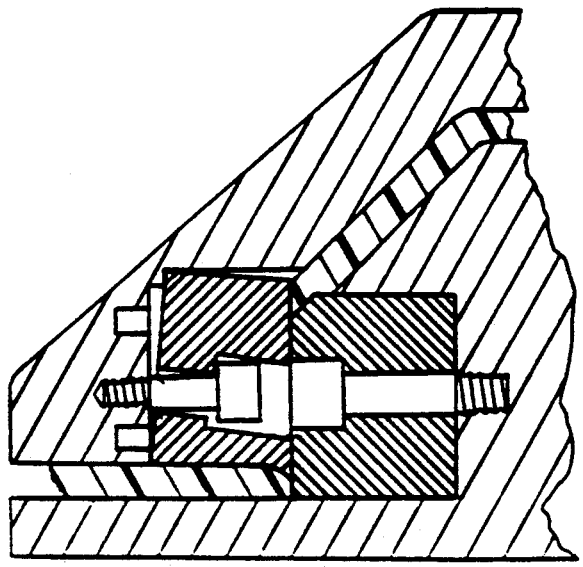
FIG. 4 shows the mold arrangement of FIG. 3 in its final molding position.

FIG. 2 shows the female and male mold halves in motion towards each other as indicated by direction arrows 34 and 36. The male and female mold halves, and therefore the female key 14 and male key 16, are normally registered in relation to each other so that on closure of the mold halves initial contact between the male and female keys will be the cutting edge 24 and bevelled edge 26. This is the relationship shown in FIG. 2 wherein the initial contact involves cutting edge 24, bevelled edge 26 and softened plastic 22 therebetween. Male key 16 is fixed in place and female key 14 is free to move, to a certain extent consistent with its loose support by shoulder bolt 18 and appropriate clearances between the shoulder bolt, female key 14 and the top female mold. As the mold halves continue to approach one another, cutting edge 24 rides off bevelled edge or surface 26 and in so doing pierces through softened thermoplastic film 22. Since female key 14 is free to move, planar surface 28 is turned or tilted so as to be in contact with and parallel to vertical face 30. As the mold halves move still closer together, planar face 28 slidingly engages vertical face 30 so as to push apart the edges of the slit orifice formed after initial contact of cutting surface 24 and bevelled surface 26. FIG. 4 shows the mold halves in their final molding relationship and male and female keys 14 and 16 effecting full expansion of the latch hole orifice in the molded plastic 22. Using this technique the two latch hole orifices for a 12 cell egg carton could measure 2 cm by 1 cm. Separation of the mold halves 10 and 12 to the position they occupy in FIG. 1, permits removal of the molded member 22 now containing an orifice therein. Located in top female mold 10 adjacent to the chamber occupied by female key 14 are a pair of gas tubes 32 communicating with said chamber. After separation of the mold halves a force of compressed gas, for example, air, is directed through gas tubes 32 so as to impinge upon female key 14. This will cause female key 14, which is free to move, to return to its original position and attitude occupied at the beginning of the molding cycle. The gas force accomplishing this movement comes from some appropriate gas source not shown. Planar face 28 and vertical face 30 of the male and female keys are machined or otherwise prepared so that when in parallel contacting relationship they can slide across one another. One skilled in the art can easily determine the tolerances necessary to permit the necessary degree of freedom of female key 14 as it is held in position in top female mold half 10.

It is within the skill of the art to determine the optimum angle for the bevelled or chamfered edge. Knowing that the object of the operation is to permit cutting edge 24 to glance off of bevelled surface 26, it can be readily appreciated that this can be best accomplished when the bevel is less than some critical angle, e.g. 45° or less. Angles greater than this will induce unwanted interference and wear.

Figure 5:
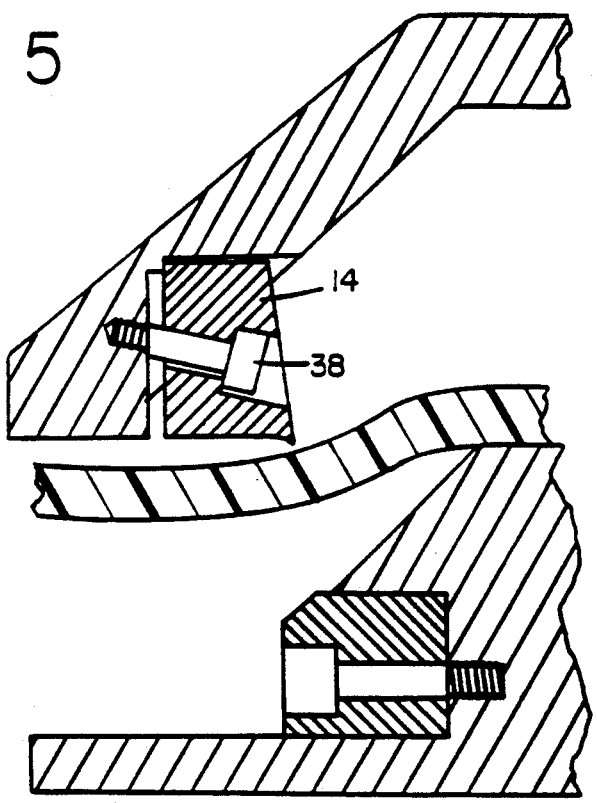
FIG. 5 shows a variation of the mold arrangement of FIG. 1.

Once the molding operation has been completed and simultaneously therewith the desired orifice has been created in the molded member and the mold halves separated for removal of the molded part, there are alternative techniques for returning the female key member to its original position or attitude that it occupied at the beginning of the molding cycle. For example, referring to FIG. 5, instead of returning female key member 14 to its original position by way of the force of a gas stream, the force of gravity is permitted to accomplish this return. In FIG. 5, female key member 14 is held in its chamber in mold half 10 by shoulder bolt 38. Shoulder bolt 38 threads into top female mold half 10 at an angle to the horizontal and female key member 14 has a shaft to receive shoulder bolt 38. This shaft is at an angle corresponding to angle shoulder bolt 38 makes to the horizontal. Thus if this angle is, for example, 30 or 45 degrees to the horizontal and the degree of freedom between the shoulder bolt and the female key will permit planar face 28 to be brought parallel to vertical face 30, then on completion of the operation and separation of the mold halves, the force of gravity will return female key member to its original position.

It is to be understood that the gravity technique of returning the female key to its original position can be combined with the utilization of the force of compressed gas to return the female key to its original position. An important advantage of employing the compressed gas is that in addition to returning it to its original location, the force of the gas can always keep the chamber housing and female key 14 free of debris, thereby avoiding the possibility of jamming the female key in a fixed position.

Figure 6:
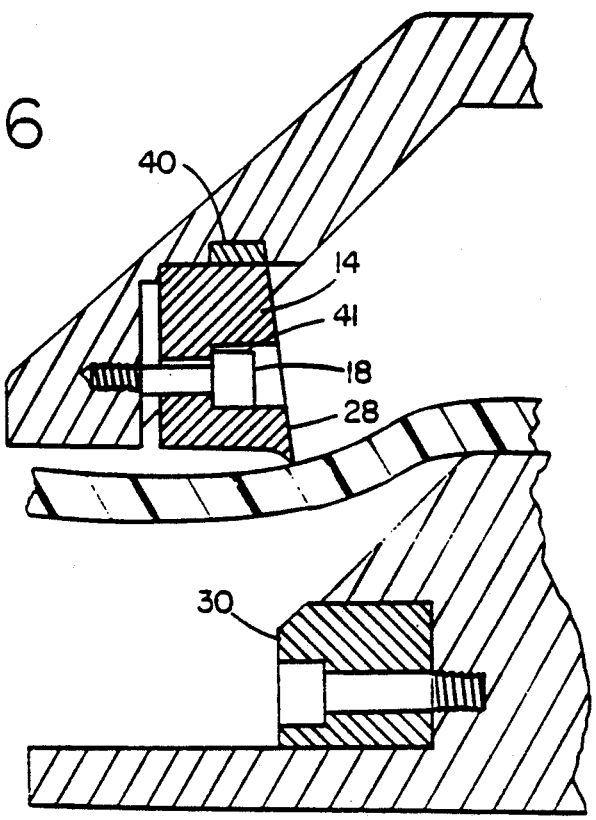
FIG. 6 shows another variation of the mold arrangement of FIG. 1.

FIG. 6 illustrates another technique of returning female key member 14 to its original position. This technique involves associating a permanent magnet 40 in a position of attraction so as to exert a slight counter clockwise turning moment on the female key member to return it to its original position or attitude after separation of the mold halves. Obviously the attractive force of the magnet on the female key member 14 is easily overcome as the female key cutting edge rides off the chamfer of the male key member. Space 41 between shoulder bolt 18 and female key 14 gives the degree of freedom to permit planar face 28 to be turned parallel to vertical face 30. Other appropriate magnetic systems including electromagnetic systems can be employed to reposition the free-to-move key member.

Figure 7:
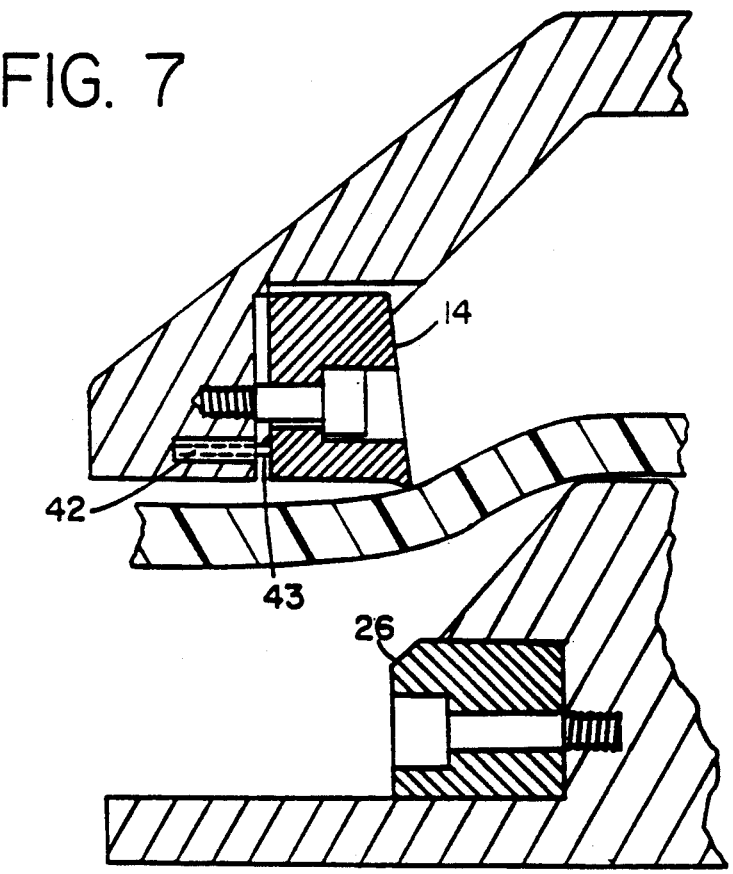
FIG. 7 shows still another mold variation of FIG. 1.

FIG. 7 illustrates still another technique for returning key member 14 to its original position. Shown therein is hydraulic line 42 operatively associated with push rod 43. Push rod 43 is located so that, in response to a force transmitted through hydraulic line 42, it reacts to push on key 14 thereby returning it to its original location upon completion of the orifice forming function. During the next cycle the hydraulic force is relaxed and female key 14 is free to ride off chamfer 26.

As indicated above, the key members described can be reversed in position. In other words, the key member carrying the chamfer 26 can be fixed in the top or female mold and the key 14 carrying the cutting edge can be located in the bottom mold and positioned so as to be free to move as described above. The described mold arrangement can be employed to form one or any number of orifices during a molding system. Specific utility can be its employment in the formation of egg cartons, sandwich containers, etc. The thermoplastic material employed to form such molded structures can be any thermoplastic film, both of the foamed or unfoamed variety.

It is to be understood that the foregoing description is merely illustrative of preferred embodiments of the invention, of which many variations may be made by those skilled in the art within the scope of the following claims without departing from the spirit thereof.

What is claimed is:

1. In the process of creating an orifice in a plastic part during the shape molding thereof comprising:
    placing moldable plastic between a pair of conformable mold members and applying compression thereto wherein during said molding opposed key members in each mold member pierce and form an orifice in said plastic;
    the improvement comprising: providing a cutting edge on one key member adjacent to a planar face thereon and a vertical surface having a bevelled edge on the other key member; one of said keys being fixed in its mold part and the other key being located in its mold part and supported so as to be free to be moved independently thereof by turning or tilting; registering said keys and closing said mold parts so that initial contact will involve said cutting edge, said bevelled edge and said plastic therebetween, thereby turning or tilting said other key so that said vertical surface is in contact with and parallel to said planar face; further closing said mold parts so that said cutting edge will ride off said bevelled edge surface and slide across said vertical surface, piercing and enlarging a latch opening in said plastic; and separating said mold parts, removing the shaped plastic and positioning the mold member carrying said free to move key so that it will return by force of gravity to its original position occupied just prior to said initial contact.

2. In the process of creating an orifice in a plastic part during the shape molding thereof comprising:
    placing moldable plastic between a pair of conformable mold members and applying compression thereto wherein during said molding opposed key members in each mold member pierce and form an orifice in said plastic;
    the improvement comprising: providing a cutting edge on one key member adjacent to a planar face thereon and a vertical surface having a bevelled edge on the other key member; one of said keys being fixed in its mold part and the other key being located in its mold part and supported so as to be free to be moved independently thereof by turning or tilting; registering said keys and closing said mold parts so that initial contact will involve said cutting edge, said bevelled edge and said plastic therebetween, thereby turning or tilting said other key so that said vertical surface is in contact with and parallel to said planar face; further closing said mold parts so that said cutting edge will ride off said bevelled edge surface and slide across said vertical surface, piercing and enlarging a latch opening in said plastic; and separating said mold parts, removing the shaped plastic and returning said free to move key to its original position and attitude by means of the force of propelled gas.

3. In the process of creating an orifice in a plastic part during the shape molding thereof comprising:
    placing moldable plastic between a pair of conformable mold members and applying compression thereto wherein during said molding opposed key members in each mold member pierce and form an orifice in said plastic;

the improvement comprising: providing a cutting edge on one key member adjacent to a planar face thereon and a vertical surface having a bevelled edge on the other key member; one of said keys being fixed in its mold part and the other key being located in its mold part and supported so as to be free to be moved independently thereof by turning or tilting; registering said keys and closing said mold parts so that initial contact will involve said cutting edge, said bevelled edge and said plastic therebetween, thereby turning or tilting said other key so that said vertical surface is in contact with and parallel to said planar face; further closing said mold parts so that said cutting edge will ride off said bevelled edge surface and slide across said vertical surface, piercing and enlarging a latch opening in said plastic; and separating said mold parts, removing the shaped plastic and returning said free to move key to its original position and attitude by means of the force of gravity and propelled gas.

4. In the process of creating an orifice in a plastic part during the shape molding thereof comprising:

placing moldable plastic between a pair of conformable mold members and applying compression thereto wherein during said molding opposed key members in each mold member pierce and form an orifice in said plastic;

the improvement comprising: providing a cutting edge on one key member adjacent to a planar face thereon and a vertical surface having a bevelled edge on the other key member; one of said keys being fixed in its mold part and the other key being located in its mold part and supported so as to be free to be moved independently thereof by turning or tilting; registering said keys and closing said mold parts so that initial contact will involve said cutting edge, said bevelled edge and said plastic therebetween, thereby turning or tilting said other key so that said vertical surface is in contact with and parallel to said planar face; further closing said mold parts so that said cutting edge will ride off said bevelled edge surface and slide across said vertical surface, piercing and enlarging a latch opening in said plastic; and separating said mold parts, removing the shaped plastic and returning said free to move key to its original position and attitude by means of the hydraulically transmitted force.

5. In the process of creating an orifice in a plastic part during the shape molding thereof comprising:

placing moldable plastic between a pair of conformable mold members and applying compression thereto wherein during said molding opposed key members in each mold member pierce and form an orifice in said plastic;

the improvement comprising: providing a cutting edge on one key member adjacent to a planar face thereon and a vertical surface having a bevelled edge on the other key member; one of said keys being fixed in its mold part and the other key being located in its mold part and supported so as to be free to be moved independently thereof by turning or tilting; registering said keys and closing said mold parts so that initial contact will involve said cutting edge, said bevelled edge and said plastic therebetween, thereby turning or tilting said other key so that said vertical surface is in contact with and parallel to said planar face; further closing said mold parts so that said cutting edge will ride off said bevelled edge surface and slide across said vertical surface, piercing and enlarging a latch opening in said plastic; and separating said mold parts, removing the shaped plastic and returning said free to move key to its original position and attitude by means of the magnetic force.

* * * * *